No. 715,038. Patented Dec. 2, 1902.
M. V. DUNHAM.
MIRROR SUPPORT.
(Application filed Nov. 29, 1901.)
(No Model.)
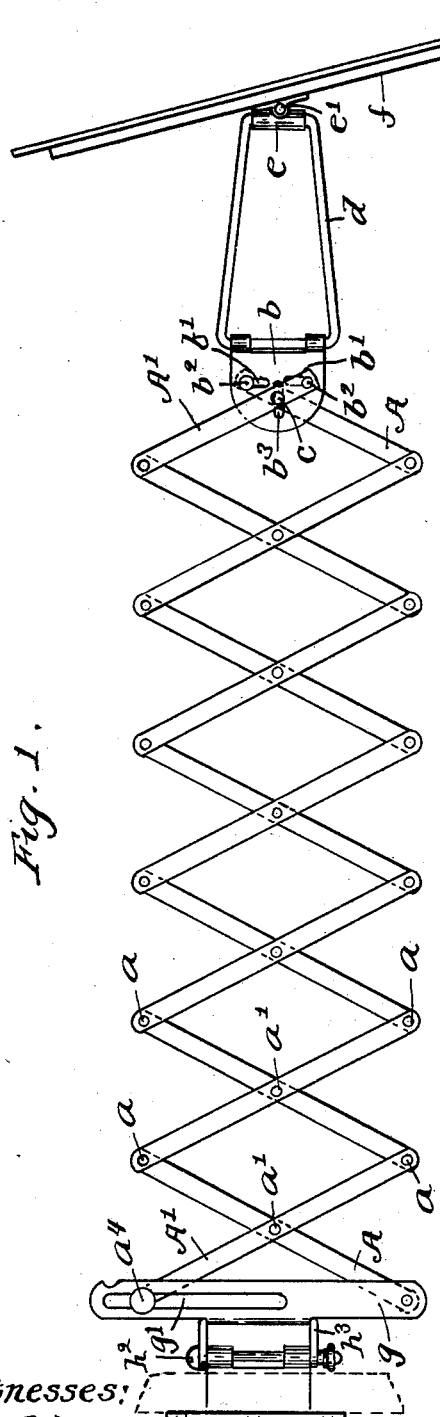
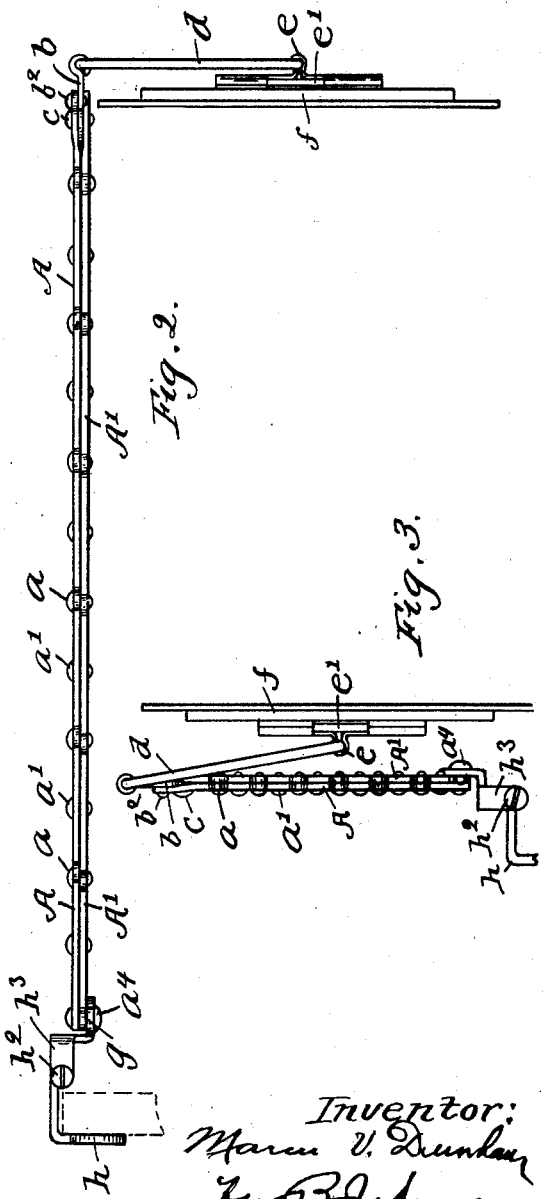

UNITED STATES PATENT OFFICE.

MARCUS V. DUNHAM, OF RUTHERFORD, NEW JERSEY.

MIRROR-SUPPORT.

SPECIFICATION forming part of Letters Patent No. 715,038, dated December 2, 1902.

Application filed November 29, 1901. Serial No. 84,039. (No model.)

*To all whom it may concern:*

Be it known that I, MARCUS V. DUNHAM, of Rutherford, county of Bergen, State of New Jersey, have invented an Improvement in Mirror-Supports, of which the following description, in connection with the accompanying drawings, is a specification, like letters on the drawings representing like parts.

This invention relates to extensible brackets or supports for small mirrors, and has for its object to construct an extensible bracket or support which may be clamped to a bureau-mirror or its support or to any other object, and when not in use may be compactly folded and covered, and thereby concealed by the small mirror carried by it, and which when extended will support said small mirror at a suitable distance away from and in front of the bureau-mirror at different angles, to thereby reflect in said bureau-mirror any object which may be between the two mirrors, yet said small mirror may also be supported back to the bureau-mirror instead of facing it.

The mirror-support embodying this invention comprises, essentially, a supporting-arm adapted to be attached to any object and thereby supported, a loop-like link pivotally connected to the extremity of said supporting-arm and also pivotally connected to the middle of the back of the mirror, said link being made long enough to provide for reversing the position of the mirror in order that it may occupy a position either back to or facing the mirror or support to which its supporting-arm is attached and being connected to the middle of the back of the mirror permits said mirror to be swung to either side of its supporting-arm and reversed. The supporting-arm is made extensible and is adapted to be held firmly in any position of adjustment, so that the mirror may be drawn out more or less as desired and at all times firmly held. Means are also provided whereby the mirror is supported at the extremity of its supporting-arm in such manner that it may tilt on a horizontal axis in addition to having a swinging movement.

Figure 1 shows in side elevation a mirror-support embodying this invention, the supporting-arm being extended and the mirror being tilted, but not reversed. Fig. 2 is a plan view of the mirror-support shown in Fig. 1, the mirror being swung to one side of its support and reversed; and Fig. 3 is a plan view of the mirror-support, showing the supporting-arm in its contracted position and the mirror swung into a position against it to illustrate the compact form into which the parts may be arranged.

A A' represent the bars or links composing the lazy-tongs, which are pivotally connected together at their ends, as at $a$, and at points between their ends, as at $a'$. The lazy-tongs is designed and intended to serve as and constitute an extensible supporting-arm. A plate $b$ is provided at the outer end of the lazy-tongs, which is formed or provided with two vertical slots $b'\ b'$, which receive the pivot-studs $b^2\ b^2$ at the ends of the end links or bars A A', said studs working up and down in said slots as the supporting-arm is extended and contracted. The plate $b$ has also a horizontal slot $b^3$, located between the vertical slots $b'\ b'$, which receives the pivot-stud $c$, passing through both end links A A' of the lazy-tongs at a point remote from their ends. By providing a plate having slots, as shown, the outer end of the lazy-tongs will be held firmly—that is, the links or bars thereof will be caused to work in proper relative positions at all times. A loop-like link $d$ is pivotally connected to the plate $b$, the outer end of which is pivotally connected to a clip $e$, which is pivotally connected to a horizontally-disposed bar $e'$, secured to the back of the mirror $f$ at or about the middle thereof. The clip $e$ swings on a horizontal axis, and its pivotal connection with the loop-like link is on a vertical axis, so that the mirror $f$ may tilt more or less, as required, on a horizontal axis in addition to having a swinging movement on a vertical axis. The loop-like link $d$ is made long enough to provide for reversing the position of the mirror $f$, so that said mirror may be disposed back to or facing the large mirror to which it is attached. The loop-like link $d$ being connected to the middle of the back of the mirror allows said mirror to be swung to either side of its supporting-arm and reversed. At the opposite end of the lazy-tongs a vertical bar $g$ is provided, to the lower end of which one of the end links of the lazy-tongs is pivotally connected, and said bar $g$ has an elongated vertical slot $g'$, which receives the pivot-stud $a^4$ at the end of the other end link of said lazy-tongs. As the lazy-tongs is extended and contracted the pivot-stud $a^4$ works up and down in the vertical slot $g'$. By providing the bar $g$ the supporting-arm will be held firmly at all times and will not sag, and its links or bars A A' will be held in proper relative positions at all times.

The bracket $h$ of any suitable construction is provided for attaching the supporting-arm to a support, and, as herein shown, said bracket comprises a leaf having holes for the reception of screws by which it is attached to the support, and another leaf at right angles thereto, which is formed or provided with ears $h'$, through which a pivot-bolt $h^2$ passes, said bolt also passing through ears $h^3 h^3$, formed on or projecting from the bar $g$. The pivot-bolt is made as a screw having a long shank and receives upon its screw-threaded end a thumb-nut to provide for the easy detachment of the bolt. By providing means for thus easily detaching the bracket it may be reversed whenever desired to better adapt it to be applied to different supports or to either side of a large mirror.

When the apparatus is not in use, it may be closed up into very compact form, the lazy-tongs and support therefor and the pivotal connections being concealed by the mirror, which will be located in front of them.

The mirror may be drawn out at any desired distance and held in any different angle and also reversed at either side of its supporting-arm and in its reversed position likewise held in any different angle, and at all times a firm structure will be provided.

I claim—

1. A mirror-support consisting of a supporting-arm comprising a lazy-tongs, pivot-studs at the ends of the end links thereof, and a pivot-stud passing through both of said end links at a point remote from the ends thereof, a plate having slots for all of said pivot-studs and a mirror pivotally connected with said plate, substantially as described.

2. A mirror-support consisting of a supporting-arm comprising essentially a lazy-tongs, pivot-studs at the ends of the end links thereof, and a pivot-stud passing through both of said end links at a point remote from the ends thereof, a plate having slots for all of said pivot-studs, a loop-like link pivotally connected to said plate adapted to swing on a vertical axis, and a mirror connected to said link, said link being made long enough to provide for reversing the position of the mirror, substantially as described.

3. A mirror-support consisting of a supporting-arm comprising essentially a lazy-tongs, pivot-studs at the ends of the end links thereof and a pivot-stud passing through both of said end links at a point remote from the ends thereof, a plate having slots for all of said pivot-studs, a loop-like link pivotally connected to said plate adapted to swing on a vertical axis, a clip pivotally connected to the extremity of said link also adapted to swing on a vertical axis, and a horizontal bar at the middle of the back of the mirror to which said clip is loosely connected, said link being made long enough to provide for reversing the position of the mirror, substantially as described.

In testimony whereof I have signed my name to this specification in the presence of two subscribing witnesses.

MARCUS V. DUNHAM.

Witnesses:
 B. J. NOYES,
 H. B. DAVIS.